(No Model.)
W. R. SCOTT.
RAIN WATER CUT-OFF AND FILTER.
No. 347,203. Patented Aug. 10, 1886.
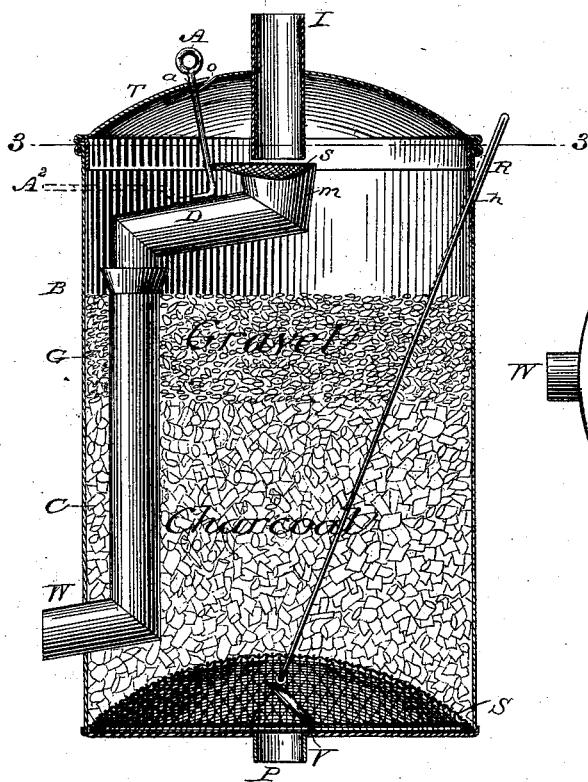
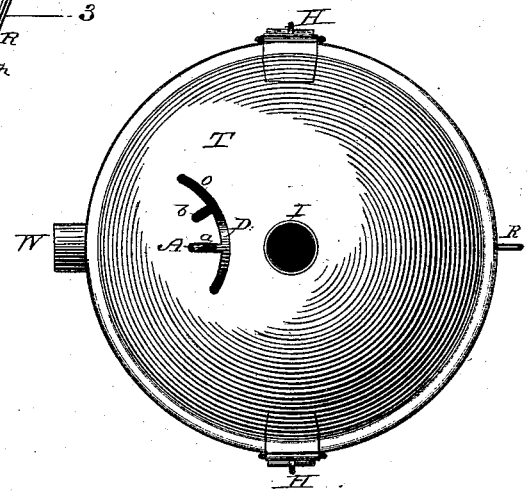
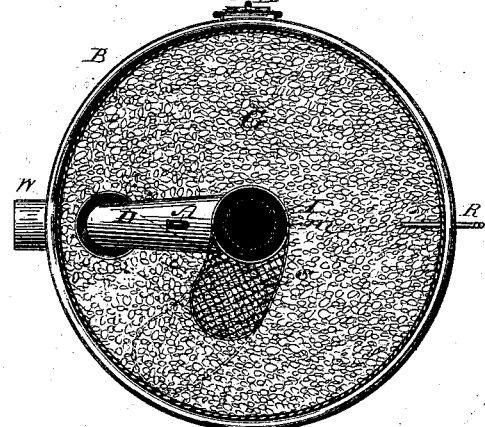
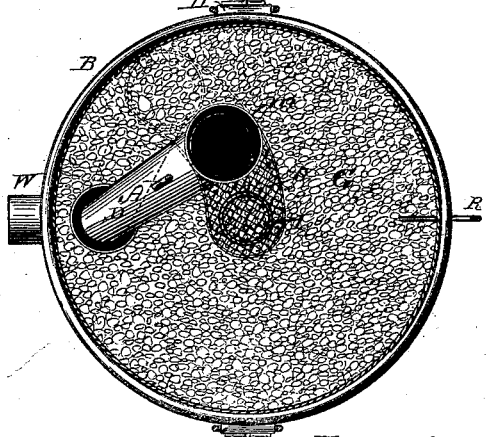
Witnesses:
Ed. A. Newman,
Al. C. Newman.
Inventor.
WINFIELD R. SCOTT,
By his Attorney,

UNITED STATES PATENT OFFICE.

WINFIELD R. SCOTT, OF DANVILLE, KENTUCKY, ASSIGNOR OF ONE-HALF TO JOHN M. HACKNEY, OF SAME PLACE.

RAIN-WATER CUT-OFF AND FILTER.

SPECIFICATION forming part of Letters Patent No. 347,203, dated August 10, 1886

Application filed December 11, 1885. Serial No. 185,381. (No model.)

*To all whom it may concern:*

Be it known that I, WINFIELD R. SCOTT, a citizen of the United States, residing at Danville, in the State of Kentucky, have invented a new and useful Improvement in Rain-Water Cut-Offs and Filters, of which the following is a specification.

This invention relates to apparatus for deflecting the water which flows from the roof until the roof becomes washed, and then turning the water through filtering media into a cistern.

The present invention is preferably embodied in a combined cut-off and filter so constructed that an ample supply of charcoal and gravel or like filtering material may be supported upon a circular wire screen occupying the whole area of the bottom of the apparatus, the waste-water outlet extending laterally out of the apparatus above said screen.

This invention consists, first, in the combination, with a fixed water-inlet and a fixed outlet-elbow for the waste water, of a deflecting-elbow having at its free extremity an upwardly-turned mouth, and provided with a concave supplemental screen at one side of its mouth, and adapted to receive the discharge from the top of said screen, for the purpose of separating leaves and the like from water flowing into the filter, and discharging such trash through the waste-water outlet; and, lastly, in the combination, in a rain-water cut-off and filter having its pure-water outlet in the bottom, of a flap-valve applied to said outlet, an arched main screen resting on the bottom at its perimeter, and forming a working-space above said valve, and a rod extending from said valve through said screen to the upper part of the apparatus as means for readily cleansing the filtering material without disturbing the latter, as hereinafter fully set forth.

A sheet of drawings accompanies this specification as part thereof.

Figure 1 of these drawings represents a vertical section of my improved cut-off and filter. Fig. 2 represents a top view thereof, and Figs. 3 and 4 represent horizontal sections in the plane indicated by the line 3 3, Fig. 1, showing the swinging elbow of the waste-water outlet in different positions by means of full and dotted lines.

Like letters of reference indicate corresponding parts in the several figures.

My combined cut-off and filter has an upright cylindrical body, B, provided with a removable top, T, in which its inlet-pipe I is fixed. Its waste-water outlet W is formed by an elbow, and extends laterally out of the apparatus. Its pure-water outlet P is formed by a central orifice in and a depending neck attached to its bottom, as shown in Fig. 1. Said inlet I is connected with a rain-spout, so as to receive the discharge of the latter, and the pure-water outlet P discharges directly or indirectly into a cistern.

Upon the bottom of the body B, and occupying, preferably, its whole area, a convex circular screen, S, of suitable wire and mesh is placed, forming a space immediately above said bottom and the pure-water outlet P, within which a flap-valve, V, is hinged and connected with a rod, R, of stiff wire, which extends upward through a mesh of said screen to a hole, $h$, near the upper end of the body B, within which its rebent end catches, as shown in full lines in Fig. 1, so as to hold the valve open while the apparatus is in effective operation. Upon said screen S an efficiently deep mass of charcoal, C, Fig. 1, is supported, and upon this a layer or layers of gravel, G, to form the filtering media or filling.

The removable top T, Figs. 1 and 2, is preferably attached by a pair of hasps, H H, hinged thereto and embracing staples on the body B in a customary way. It is furthermore provided with a curved slot or sector-opening, $o$, (best seen in Fig. 2,) through which an adjusting-rod, A, extends downward into the space between the surface of the gravel G and the top T, where it is rigidly attached to a deflecting-elbow, D, swiveled to the upper end of the outlet-elbow, W, as shown in the other figures. This deflecting-elbow has at its free end an upwardly-turned funnel-mouth, $m$, to which a concave supplemental screen, $s$, of light wire, is rigidly attached, a notch in one side of the funnel-mouth forming a communication between its concave upper side and the interior of the mouth deflecting-elbow and waste-water outlet. The deflecting-elbow, with said parts attached thereto, swings horizontally, and may occupy either of four positions, as indicated by full and dotted lines in Figs. 3 and 4, notches $a$ $b$ in one side of the sector-opening $o$ corresponding with its two main positions, as shown, or it may be confined to these two positions by modifying said sector-opening.

In the first position of the deflecting-elbow D, in which it is shown in Figs. 1 and 2, and in full lines in Fig. 3, its mouth $m$ is below the inlet I, so as to receive the dirty water which first runs from the roof, which is consequently deflected through the waste-water outlet W out of the apparatus.

In the second position of the deflecting-elbow, in which it is shown in full lines in Fig. 4, its screen $s$ is below the inlet I and catches leaves and such trash, so that these are washed into and through the deflecting-elbow and waste-water outlet, while the strained water flows through the screen upon the gravel G and filters through this and the charcoal C downward, through the main screen S and pure-water outlet P, to the cistern.

In the other positions of the deflecting-elbow (represented in dotted lines in Figs. 3 and 4) the water passes from the inlet I directly upon the gravel. It may be so shifted should the supplemental screen $s$ become clogged up.

With the deflecting-elbow in its said second position, (indicated by full lines in Fig. 4,) by disengaging the rebent upper end of the valve-rod R from the bottom of the hole $h$ and lowering the valve V, as represented in dotted lines in Fig. 1, the water is caused to thoroughly saturate the filling of gravel and charcoal, and by flowing backward therethrough and out through the deflecting-elbow and waste-water outlet it floats out dust, soot, and such impurities from the filling, and carries the same off without disturbing the charcoal and gravel. Instead of said adjusting-rod A, an adjusting-rod, $A^2$, Fig. 1, may project laterally from the deflecting-elbow.

Having thus described my said improvement in rain-water cut-offs and filters, I claim as my invention, and desire to patent under this specification—

1. The combination, substantially as herein specified, of a top provided with a fixed water-inlet, a fixed waste-water outlet, and a deflecting elbow swiveled to the upper end of said outlet, and having an upwardly-turned mouth provided with a notch in one side, and with a concave supplemental screen, the upper side of which discharges leaves and like trash into said mouth when said screen is below said inlet.

2. In a rain-water cut-off and filter, the combination of an upright body having its pure-water outlet in its bottom, a convex screen resting at its perimeter upon said bottom and supporting the filtering material, a flap-valve within the space beneath said screen to close said outlet, and a valve-rod extending through said screen to the upper part of the apparatus, as provision for cleansing the filtering material without disturbing it, substantially as herein specified.

W. R. SCOTT.

Witnesses:
 J. A. QUISENBERRY,
 JOHN A. HERON.